US012801096B2

(12) United States Patent
Bhattacharyya et al.

(10) Patent No.: US 12,801,096 B2
(45) Date of Patent: Nov. 17, 2026

(54) ARTIFICIAL INTELLIGENCE MODEL FOR OPERATING A PLANT

(71) Applicant: Schneider Electric Systems USA, Inc., Foxborough, MA (US)

(72) Inventors: Amitabha Bhattacharyya, Hyderabad (IN); Venkateswara Rao Kottana, Visakhapatnam (IN); Suhas Bendle, Chandrapur (IN); Bhaskar Sinha, Hyderabad (IN); Dinesh Gondhi, Norwood, MA (US); Ajay Mishra, Irvine, CA (US); Erna Banchik, Rancho Santa Margarita, CA (US); Diana Ivanov, Mission Viejo, CA (US)

(73) Assignee: SCHNEIDER ELECTRIC SYSTEMS USA, INC., Foxborough, MA (US)

( * ) Notice: Subject to any disclaimer, the term of this patent is extended or adjusted under 35 U.S.C. 154(b) by 481 days.

(21) Appl. No.: 18/511,560

(22) Filed: Nov. 16, 2023

(65) Prior Publication Data

US 2025/0093826 A1 Mar. 20, 2025

(30) Foreign Application Priority Data

Sep. 19, 2023 (IN) ............................ 202311062877

(51) Int. Cl.
*G05B 13/02* (2006.01)
*G05B 13/04* (2006.01)
*G05B 17/02* (2006.01)

(52) U.S. Cl.
CPC ....... *G05B 13/0265* (2013.01); *G05B 13/048* (2013.01)

(58) Field of Classification Search
CPC ... G05B 13/0265; G05B 13/048; G05B 17/02
USPC ............................................................ 700/44
See application file for complete search history.

(56) References Cited

U.S. PATENT DOCUMENTS 11,644,821 B2 5/2023 Mishra et al.
2021/0271234 A1* 9/2021 Gooch .................... G06N 3/08
2021/0312262 A1 10/2021 Postel

FOREIGN PATENT DOCUMENTS

WO 2022184260 A1 9/2022

OTHER PUBLICATIONS

Extended European Search Report for EP Application No. 24194296.0, dated Jan. 31, 2025, 9 pages.

* cited by examiner

*Primary Examiner* — Michael J Brown
(74) *Attorney, Agent, or Firm* — Stinson LLP

(57) ABSTRACT

A machine-learned method and system for use in operating an industrial plant. A digital twin of the industrial plant is configured to simulate plant operations based on operating variables from a data store. A machine-learned model comprises a stabilizing agent and a disrupting agent. The stabilizing agent modifies the operating variables within the digital twin to perform a stabilizing action for limiting a degree of shutdown and the disrupting agent modifies the operating variables within the digital twin to perform a disruptive action for increasing the degree of shutdown. A composite action reward is configured to reward the machine-learned model for reducing the degree of shutdown from an initial state of the digital twin to a post-action-state of the digital twin.

20 Claims, 3 Drawing Sheets

ARTIFICIAL INTELLIGENCE MODEL FOR OPERATING A PLANT

FIELD

The present disclosure generally relates to a machine-learned model for use in an industrial plant.

BACKGROUND

Industrial plants may encounter process upsets and shutdowns within the plant. Process upsets and shutdowns may negatively impact plant performance and safety. Hence, it is important to mitigate the upsets and shutdowns as soon as possible to reduce the impact the upsets and shutdowns have on the plant.

Current mitigating operations that are taken to stabilize processes within the industrial plant and prevent hazards are largely dependent on plant operators' knowledgebase and experience levels. In some instances, it can take plant operators hours to a few days to determine an optimal mitigating strategy for stabilizing the plant, then additional time for implementation. In other instances, plant operators may be required to act immediately to stabilize the plant, without having time to determine the optimal mitigating strategy. Both instances may incur additional hazards to the plant.

Therefore, improved systems and methods are needed to determine and implement an optimal mitigating strategy for stabilizing a plant during a process upset or plant shutdown.

SUMMARY

Aspects of the present disclosure permit building and utilizing an artificial intelligence (AI) model for plant operation. In an example implementation, the AI model is trained using reinforcement learning based on past process disturbance data and extrapolated scenarios using a digital twin environment.

One aspect of the present disclosure involves a computer-implemented method for training a machine-learned model for use in an industrial plant. The method comprises obtaining a training variable input from a data store. The data store is configured to store a plurality of operating variables relating to plant operations in the industrial plant. The plant operations are simulated within a digital twin of the industrial plant. The training variable input is processed with the machine-learned model. An initial degree of shutdown is evaluated based on standard operating conditions criteria to analyze an initial state of the digital twin of the industrial plant. At least one of a stabilizing action and a disrupting action is executed to modify one or more operating variables within the digital twin. A subsequent degree of shutdown is evaluated based on the standard operating conditions criteria to analyze a post-action state of the digital twin. The subsequent degree of shutdown is compared to the initial degree of shutdown to determine a change in degree of shutdown within the digital twin. A composite action reward is obtained based on at least the change of degree of shutdown within the digital twin. The composite action reward is configured to reward the machine-learned model for reducing the subsequent degree of shutdown relative to the initial degree of shutdown. A prediction is generated based on the composite action reward. The prediction is configured for optimizing the degree of shutdown in plant operations in the industrial plant.

In another aspect, a system for operating an industrial plant comprises a data store of a plurality of operating variables relating to plant operations within the industrial plant. A digital twin of the industrial plant is configured to simulate plant operations based on the operating variables from the data store. A machine-learned model comprises a stabilizing agent configured to modify one or more of the operating variables within the digital twin to perform at least one stabilizing action in the digital twin. The stabilizing action is configured to limit a degree of shutdown, wherein the degree of shutdown is representative of a likelihood of a shutdown in the plant operations occurring based on present values of the operating variables in a given state. A disrupting agent is configured to modify one or more of the operating variables within the digital twin to perform at least one disruptive action in the digital twin. The disruptive action is configured to increase the degree of shutdown. An action scheduler is configured to schedule either the stabilizing agent to perform the stabilizing action or the disrupting agent to perform the disruptive action. A composite action reward is configured to reward the machine-learned model for reducing the degree of shutdown from an initial state of the digital twin to a post-action-state of the digital twin. The composite action reward is further configured to penalize the machine-learned model for increasing the degree of shutdown from an initial state of the digital twin to a post-action-state of the digital twin. A prediction generator is configured to generate a prediction based on the composite action reward. An operating instructions generator is configured to generate operating instructions based on the prediction for optimizing the plant operations.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
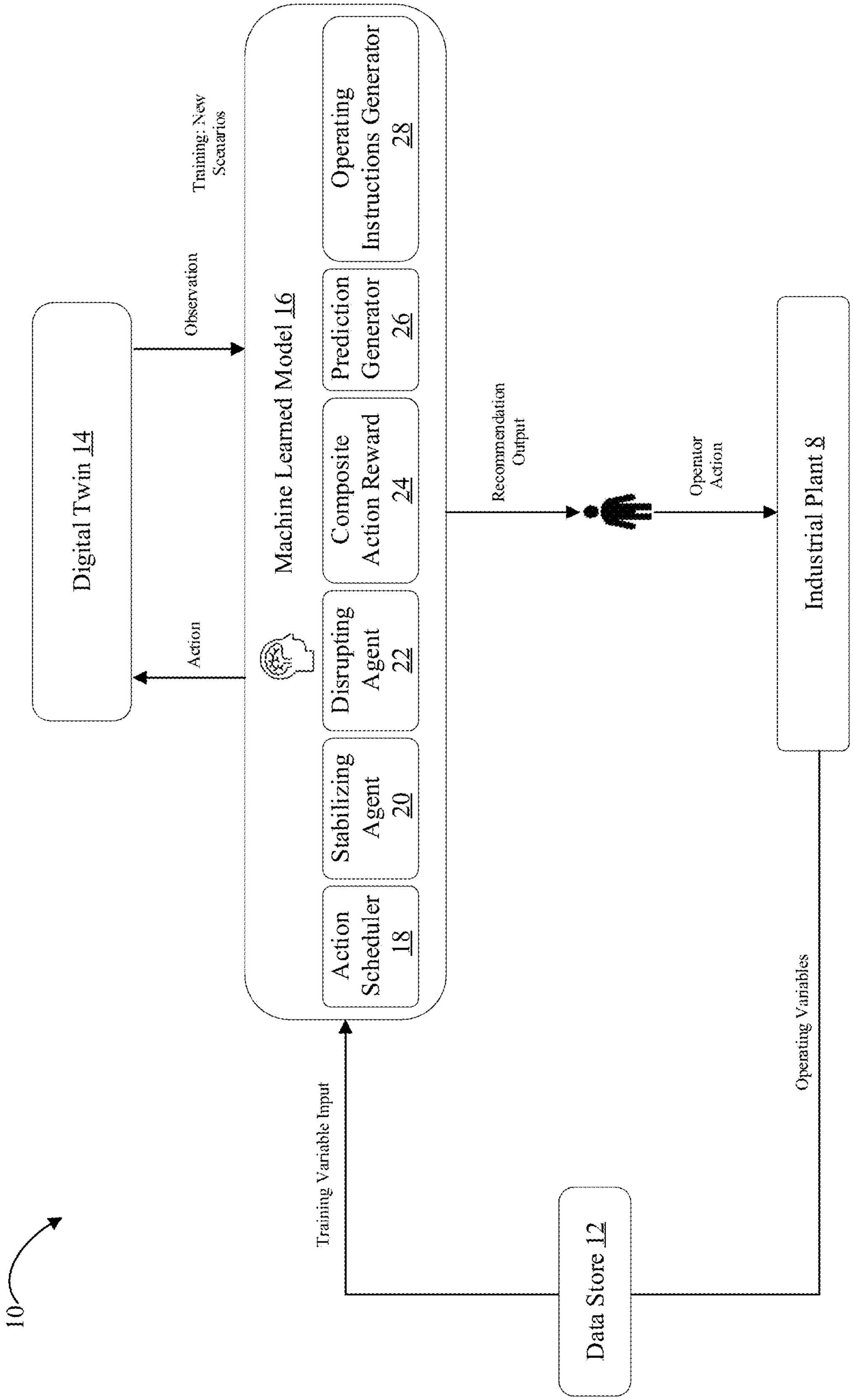
FIG. 1 is a block diagram illustrating a system for operating an industrial plant according to an embodiment.

A system for operating an industrial plant 8 is generally indicated at reference number 10. The system 10 comprises a data store 12, a digital twin 14, and a machine-learned model 16 with action scheduler 18, stabilizing agent 20, disrupting agent 22, and composite action reward 24, prediction generator 26, and operating instructions generator 28. The system 10 is configured to monitor operating variables relating to plant operations within the industrial plant 8 to obtain a training variable input. The digital twin 14 is configured to simulate the plant operations based on the training variable input. The machine-learned model 16 is configured to process the training variable input using the digital twin 14 as a processing environment. The machine-learned model 16 evaluates an initial degree of shutdown within the digital twin 14. The action scheduler 18 schedules either the stabilizing agent 20 or disrupting agent 22 to act in the digital twin 14. The machine-learned model 16 evaluates a subsequent degree of shutdown to analyze a post-action state of the digital twin 14. Suitably, the machine-learned model 16 obtains the composite action reward 24 based on the change of degree of shutdown within the digital twin 14 from the initial state to the post-action state. The prediction generator 26 generates a prediction based on the composite action reward 24 that optimizes the degree of shutdown to provide a mitigating strategy to perform within the industrial plant 8. The operating instructions generator 28 generates operating instructions to perform in the industrial plant 8, based on the prediction. Plant operators may use the system 10 to monitor plant operations (including process upsets and plant shutdowns) within the plant 8. As explained in further detail below, the plant operator may use the machine-learned model 16 to efficiently determine and implement an optimal mitigating strategy for stabilizing the industrial plant 8 during process upsets or plant shutdowns.

The industrial plant 8 of the present disclosure may refer to any facility which is used in connection with or as part of any process or system for industrial production. Process upsets may include any instances within the industrial plant 8 that cause a disruption to process flow, quality, and throughput. Plant shutdowns may include any instances within the plant that stop process flow entirely. As shown in FIG. 1, the system 10 is configured to operate the entire industrial plant 8, but it will be understood that the system 10 may be configured to operate individual components of the industrial plant 8 such as equipment, processes and sub-processes.

The data store 12 is configured to monitor and store a plurality of operating variables relating to plant operations in the industrial plant 8. The operating variables comprise, for example, at least one of operator actions data, alarms data, process behavior data, safety data, equipment data, and constraints data, however it will be apparent to a person skilled in the art that the operating variables may include other data relevant to plant operations without departing from the scope of the present disclosure. The data store 12 may further comprise a pre-processing component that is configured to pre-process the operating variables based on scenarios including one or more industrial processes to be considered for training. The data store is configured to send the operating variables as a training variable input to the digital twin 14 and machine-learned model 16.

The digital twin 14 is configured to simulate the industrial plant 8 and simulate plant operations based at least in part on the training variable input from the data store 12. The digital twin 14 provides a processing environment in which the machine-learned model may use to process the training variable input from the data store 12.

The machine-learned model 16 is configured to receive the training variable input from the data store 14 and process the training variable input to provide an optimal mitigating strategy for stabilizing the plant 8 during a process upset or shutdown. The machine-learned model 16 utilizes the degree of shutdown to assess process health, as the degree of shutdown determines the likelihood of a shutdown occurring based on operating variable values and standard operating conditions criteria. The standard operating conditions criteria defines regions of operating conditions within the industrial plant 8 (i.e., low damage region, high damage region, safe region). The machine-learned model 16 includes the action scheduler 18 configured to schedule either the stabilizing agent 20 or the disrupting agent 22. The action scheduler 18 determines which agent to schedule based on at least one of an initial degree of shutdown and historical operating data from the plant 8. In an embodiment, the action scheduler 18 is further configured to determine a time frame based on a hyper-parameter in which the respective action must be executed. The hyper-parameter is configured to be modified based on at least one or more training requirements.

The stabilizing agent 20 is configured to perform stabilizing actions in the digital twin 14 by modifying one or more operating variables of the digital twin 14 to maintain or reduce the degree of shutdown. The stabilizing actions are based on operator actions taken within the industrial plant 8 to stabilize the plant, as well as mitigating strategies from engineering documents. Alternatively, the disrupting agent 22 is configured to perform disrupting actions in the digital twin 14 by modifying one or more operating variables within the digital twin to increase the degree of shutdown. The disrupting actions are based on historical process upset and plant shutdown data as well as extrapolated operations scenarios.

The machine-learned model 16 is further configured to obtain the composite action reward 24 based on at least a change of degree of shutdown from an initial state of the digital twin 14 relative to a post-action state of the digital twin. The composite action reward 24, in one example, is configured for a parameter independent of degree of shutdown, by using absolute values of the parameter and configuring desired values. The composite action reward 24 comprises a state reward, state change reward and directional reward. The state reward determines whether the degree of shutdown of the initial state of the digital twin 14 and the degree of shutdown of the post-action state of the digital twin is the same. The state-change reward determines whether the degree of shutdown of the initial state and the degree of shutdown of the post-action state is different. The directional award determines whether the degree of shutdown of the post-action state is either closer to or further away from a degree of shutdown of a desired (i.e., safe) operating state than the degree of shutdown of the initial state. The composite action reward 24 will either reward or penalize the machine-learned model 16 based on the state reward, state-change reward and directional reward as explained in further detail below.

Figure 2:
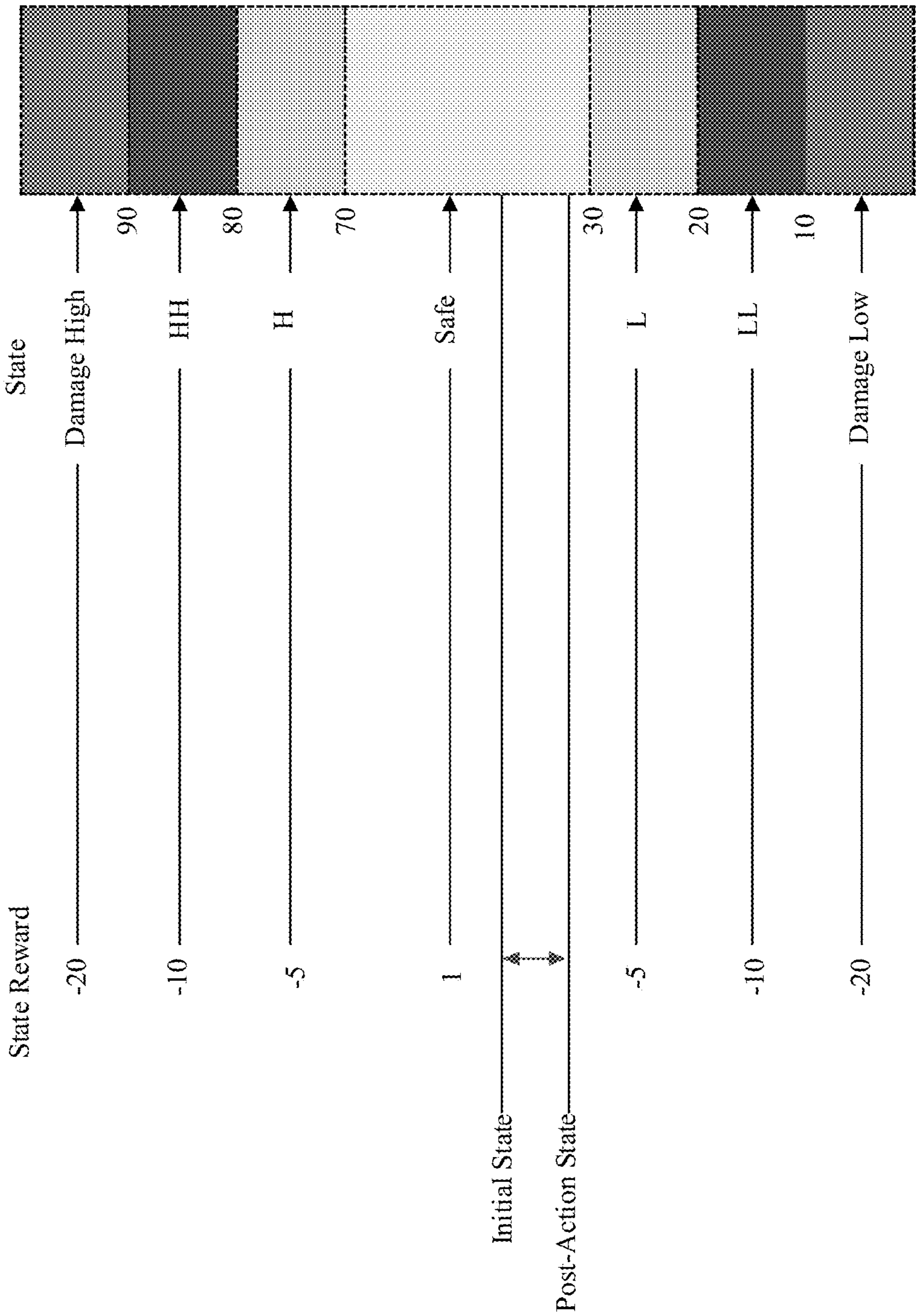
FIG. 2 is an illustration of an example of determining a composite action reward according to an embodiment.

In the example of FIG. 2:

Assume Tank Level: 100 m $$\text{Composite Reward} = a1 * \text{state\_reward} + b1 * \text{state\_change\_reward} + c1 * \text{directional\_reward}$$

- State Reward: EX: Digital twin state is in L-LL (i.e. 20-30) region, the machine-learned model will be penalized for the time it spent in that region.
- State Change Reward: EX: Digital twin state shifts to Safe region (30-70); the machine-learned model will be rewarded for the movement.
- Directional Reward: EX: While digital twin state is in L-LL (20-30), the machine-learned model is getting penalized for being in that state, but the directional reward will provide positive rewards to move towards (25→27) safe region.

a1,b1,c1 are constants which can be tuned based on a scenario type

Based on the composite action reward 24, the prediction generator 26 of the machine-learned model 16 is configured to generate a prediction for optimizing the degree of shutdown, plant performance and safety in the industrial plant 8. The prediction comprises one or more stabilizing actions, that were performed in the digital twin 14 to optimize the degree of shutdown, and a predicted degree of shutdown for each stabilizing action. Accordingly, the operating instructions generator 28 of the machine-learned model is configured to generate operating instructions based on the prediction. The operating instructions generator 28 organizes the one or more stabilizing actions of the prediction into operator instructions to perform in the industrial plant 8. The system 10 is configured to communicate the prediction and operating instructions as a recommendation output to a plant operator via a display. The plant operator may use the recommendation output to determine how to stabilize the industrial plant 8 during a process upset or plant shutdown. Further, the plant operator may perform operator actions within the industrial plant 8 based on the operating instructions to stabilize the industrial plant 8. In one suitable embodiment, the system 10 may include a controller configured to automatically execute the operating instructions within the industrial plant 8 to stabilize the plant.

The system 10, as discussed above comprises the machine-learned model 16 and is configured for operating an industrial plant. A computer-implemented method for training the machine-learned model for use in an industrial plant is further described below. Initially, the data store 12 stores operating variables relating to plant operations. The data store 12 sends the operating variables as a training variable input to the digital twin 14 and the machine-learned model 16. The digital twin 14 simulates plant operations of the industrial plant 8 based on the training variable input.

Figure 3:
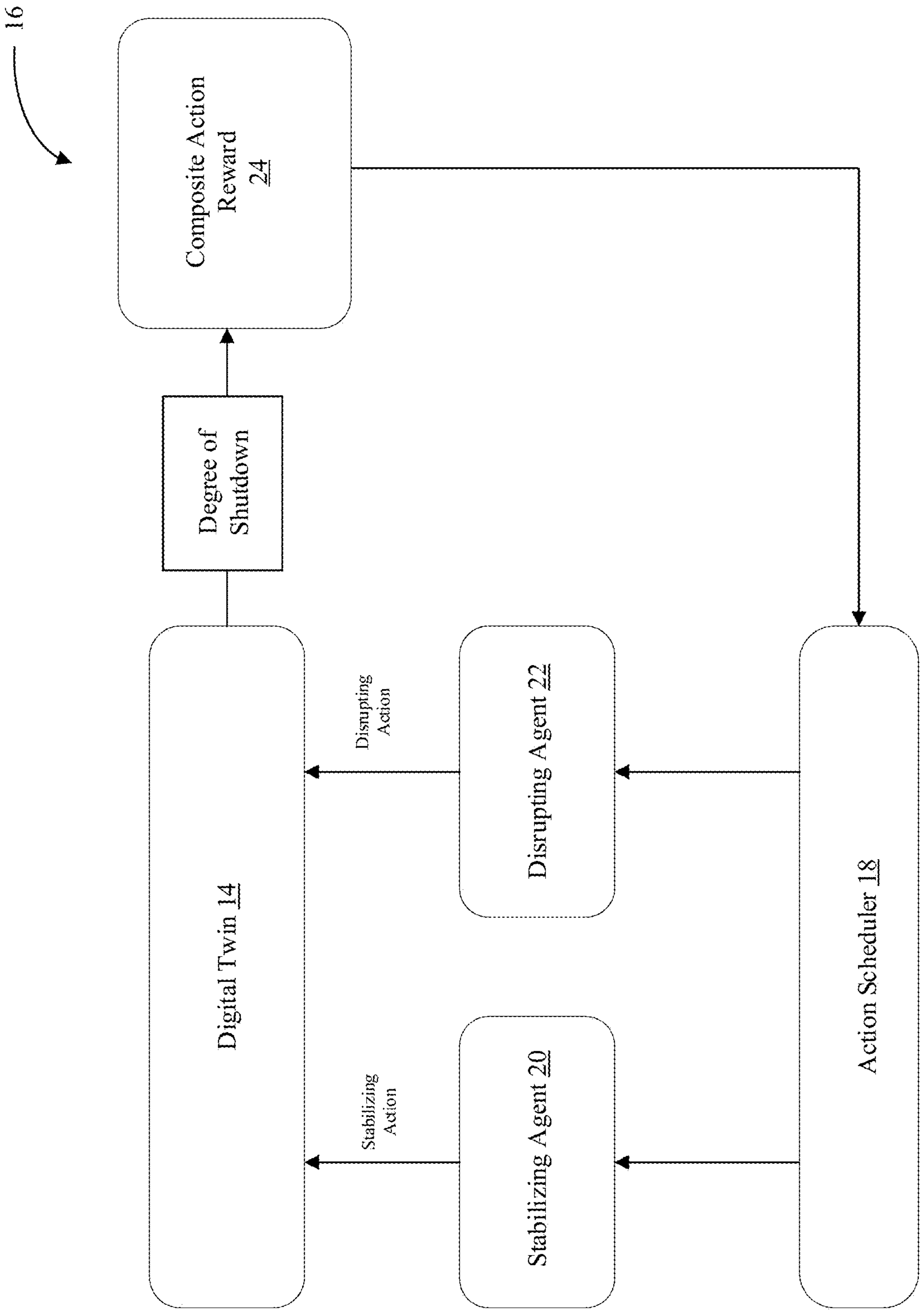
FIG. 3 is a flow diagram illustrating an example process of a machine-learned model of the system according to an embodiment.

Referring now to FIG. 3 the machine-learned model 16 processes the training variable input. First, the machine-learned model 16 evaluates an initial degree of shutdown based on standard operating conditions criteria to analyze an initial state of the digital twin 14. The action scheduler 18 determines, based on at least one of the initial degree of shutdown and historical plant operating data, whether to schedule the stabilizing agent 20 or disrupting agent 22 to execute either a stabilizing action or disrupting action within the digital twin 14. Furthermore, the action scheduler 18 determines a time frame in which either the stabilizing agent 20 or disrupting agent 22 must execute either the stabilizing or disrupting action. The scheduled agent executes at least one of the stabilizing action or disrupting action to modify one or more operating variables within the digital twin 14. The machine-learned model 16 evaluates a subsequent degree of shutdown based on the same standard operating conditions criteria to analyze a post-action state of the digital twin 14. The machine-learned model 16 compares the subsequent degree of shutdown to the initial degree of shutdown to determine a change in the degree of shutdown within the digital twin 14. The machine-learned model 16 determines and obtains the composite action reward 24 based on at least the change of degree of shutdown within the digital twin 14.

The machine-learned model 16 processes the training variable input until the composite action reward 24 is optimized such that the degree of shutdown within the digital twin 14 is in a safe region. The prediction generator 26 of the machine-learned model 16 generates a prediction based on the composite action reward 24, thereby generating a prediction that optimizes the degree of shutdown in the industrial plant 8. Moreover, the operating instructions generator 28 generates operating instructions with operator actions to perform in the industrial plant 8 based on the prediction. In one embodiment the system 10 automatically performs the operator actions within the industrial plant 8 via the controller. In another embodiment, the system 10 communicates the operating instructions and prediction via a recommendation output to a plant operator via the display for the plant operator to perform in the industrial plant 8.

In an exemplary embodiment, the method further comprises validating and retraining the machine-learned model 16. Suitably, an initial degree of shutdown of an initial state of the industrial plant 8 may be evaluated. Operator actions based on the operating instructions of the digital twin 14 are performed and monitored in the industrial plant 8. A subsequent degree of shutdown of a post-operator-action state of the industrial plant 8 may be evaluated. The initial degree of shutdown of the initial state of the industrial plant 8 is compared to the subsequent degree of shutdown of the post-operator-action state to determine a change in the degree of shutdown within the industrial plant 8. A comparison between the change of degree of shutdown within the digital twin 14 and the industrial plant 8 is evaluated to assess performance of the machine-learned model 16. Based on the comparison, one or more parameters of the machine-learned model 16 may be modified to retrain the machine-learned model.

To use the machine-learned model 16 for predicting a future degree of shutdown within the industrial plant 8 and for developing a future mitigating strategy, the method according to an embodiment further comprises creating an extrapolated training variable input based on an extrapolated scenario of the industrial plant. The extrapolated training variable input may be sent to the digital twin 14 to simulate the extrapolated scenario within the digital twin. Suitably the machine-learned model 16 processes the extrapolated training variable input to provide a recommendation output of the extrapolated scenario.

In one embodiment, the method is used for building and utilizing the machine-learned model 16 for plant operation. The method generally involves capturing operator actions during operation of the industrial plant 8 and more particularly operator actions performed in response to process upsets and shutdowns within the industrial plant. The machine-learned model 16 is trained based at least in part on the operator actions and other operating variables relevant to the operation of the plant 8 and its associated equipment, processes and sub-processes. The machine-learned model 16 utilizes agents 20,22 trained using reinforcement learning on past process disturbances and extrapolated scenarios by using the digital twin 14 as the processing environment. The system 10 is configured to detect and predict future process upsets and shutdowns within the industrial plant 8. The machine-learned model 16 is trained using the composite action reward 24, such that the machine-learned model is rewarded to keep the operating variables in a safe state based on the degree of shutdown within the industrial plant 8.

Advantageously, the present disclosure provides systems and methods for determining and implementing an optimal mitigating strategy for stabilizing an industrial plant during a process upset or plant shutdown. The system continuously monitors operating variables within the plant to determine the degree of shutdown within the plant. This enables plant operators to quickly detect process upsets and shutdowns. Furthermore, the machine-learned model is configured to maintain an optimized degree of shutdown within the digital twin by performing stabilizing actions. The system communicates the stabilizing actions to the plant operator via a recommendation output. The recommendation output provides a mitigating strategy for stabilizing the plant that optimizes plant performance and safety. The system achieves a plant stabilizing process that eliminates variation in the process due to operator experience levels and knowledgebase, as well as reduces the time plant operators spend determining a mitigating strategy to perform in the plant.

Embodiments of the present disclosure comprise a special purpose computer including a variety of computer hardware, as described in greater detail herein and are operational with other special purpose computing system environments or configurations even if described in connection with an example computing system environment. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices. For purposes of illustration, programs and other executable program components may be shown as discrete blocks. It is recognized, however, that such programs and components reside at various times in different storage components of a computing device, and are executed by a data processor(s) of the device.

In operation, processors, computers, and/or servers may execute the processor-executable instructions (e.g., software, firmware, and/or hardware) such as those illustrated herein to implement aspects of the invention. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the present disclosure.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A computer-implemented method for training a machine-learned model for use in an industrial plant, the method comprising:

obtaining a training variable input from a data store, the data store configured to store a plurality of operating variables relating to plant operations in the industrial plant;

simulating the plant operations with a digital twin of the industrial plant;

processing the training variable input with the machine-learned model for:

evaluating an initial degree of shutdown based on standard operating conditions criteria to analyze an initial state of the digital twin of the industrial plant;

determining whether to execute a stabilizing action or a disruptive action based on at least one of the initial degree of shutdown of the digital twin or historical plant operating data from the industrial plant;

executing at least one of the stabilizing action or the disruptive action to modify one or more operating variables within the digital twin;

evaluating a subsequent degree of shutdown based on the standard operating conditions criteria to analyze a post-action state of the digital twin;

comparing the subsequent degree of shutdown to the initial degree of shutdown to determine a change in degree of shutdown within the digital twin; and obtaining a composite action reward based on at least the change of degree of shutdown within the digital twin, said composite action reward configured to reward the machine learned-model for reducing the subsequent degree of shutdown relative to the initial degree of shutdown; and generating a prediction based on the composite action reward, said prediction configured for optimizing the degree of shutdown in plant operations in the industrial plant.

2. The method of claim 1, wherein the plurality of operating variables comprises operator actions data, alarms data, process behavior data, safety data and equipment design and constraints data.

3. The method of claim 1, further comprising pre-processing the operating variables within the data store based on an industrial process.

4. The method of claim 1, wherein said evaluating the degree of shutdown comprises determining the likelihood of a shutdown occurring based on operating variable values.

5. The method of claim 1, wherein said executing at least one of the stabilizing action and the disruptive action to modify one or more operating variables within the digital twin further comprises determining a time frame based on a hyper-parameter in which the respective action must be executed, wherein the hyper-parameter is configured to be modified based on at least one or more training requirements.

6. The method of claim 1, wherein said executing the stabilizing action comprises modifying one or more of the operating variables within the digital twin to maintain or reduce the degree of shutdown in the digital twin.

7. The method of claim 1, wherein said executing the disruptive action comprises modifying one or more of the operating variables within the digital twin to increase the degree of shutdown in the digital twin.

8. The method of claim 1, wherein said determining the composite action reward comprises determining a state reward to evaluate whether the degree of shutdown of the initial state and the degree of shutdown of the post-action state is the same, determining a state change reward to evaluate whether the degree of shutdown of the initial state and the degree of shutdown of the post-action state is different and determining a directional reward to evaluate whether the degree of shutdown of the post-action state is either closer to or further away from a degree of shutdown of a desired operating state than the degree of shutdown of the initial state.

9. The method of claim 1, further comprising generating operating instructions to perform in the industrial plant based on the prediction.

10. The method of claim 9, further comprising automatically performing the operating instructions in the industrial plant via a controller.

11. The method of claim 9, further comprising communicating the operating instructions to an operator for the operator to perform in the industrial plant.

12. The method of claim 9, further comprising evaluating an initial degree of shutdown of an initial state of the industrial plant, monitoring operator actions performed in the industrial plant, evaluating a subsequent degree of shutdown of a post-operator-action state of the industrial plant, comparing the initial degree of shutdown to the subsequent degree of shutdown to determine a change in degree of shutdown within the industrial plant.

13. The method of claim 12, further comprising evaluating a comparison between the change of degree of shutdown within the digital twin to the change of degree of shutdown within the industrial plant and modifying one or more parameters of the machine-learned model based at least in part on the comparison to retrain the machine-learned model.

14. The method of claim 1, further comprising processing an extrapolated training variable input based on an extrapolated scenario within the industrial plant with the machine-learned model, and simulating the extrapolated scenario within the digital twin to predict a future degree of shutdown within the industrial plant and to determine a mitigating strategy for the extrapolated scenario.

15. A system for operating an industrial plant, the system comprising:

a data store comprising a plurality of operating variables relating to plant operations within the industrial plant;

a digital twin of the industrial plant, wherein the digital twin is configured to simulate plant operations based on the operating variables from the data store;

a machine-learned model comprising:

a stabilizing agent configured to modify one or more of the operating variables within the digital twin to perform at least one stabilizing action in the digital twin, wherein the stabilizing action is configured to limit a degree of shutdown, wherein the degree of shutdown is representative of a likelihood of a shutdown in the plant operations occurring based on present values of the operating variables in a given state;

a disrupting agent configured to modify one or more of the operating variables within the digital twin to perform at least one disruptive action in the digital twin, wherein the disruptive action is configured to increase the degree of shutdown;

an action scheduler configured to schedule either the stabilizing agent to perform the stabilizing action or the disrupting agent to perform the disruptive action; and a composite action reward configured to reward the machine-learned model for reducing the degree of shutdown from an initial state of the digital twin to a post-action-state of the digital twin, the composite action reward being further configured to penalize the machine-learned model for increasing the degree of shutdown from an initial state of the digital twin to a post-action-state of the digital twin;

a prediction generator configured to generate a prediction based on the composite action reward; and an operating instructions generator configured to generate operating instructions based on the prediction for optimizing the plant operations.

16. The system of claim 15, wherein the at least one disruptive action is based on historical process upset data.

17. The system of claim 16, wherein the composite action reward comprises a state reward to evaluate whether a degree of shutdown of the initial state and a degree of shutdown of the post-action state is the same, a state change reward to determine whether the degree of shutdown of the initial state and the degree of shutdown of the post-action state is different and a directional reward to determine whether the degree of shutdown of the post-action state is either closer to or further away from a degree of shutdown of a desired operating state than the degree of shutdown of the initial state.

18. The system of claim 15, further comprising a controller configured to automatically execute the operating instructions within the industrial plant.

19. The system of claim 15, wherein the prediction comprises one or more stabilizing actions and a predicted degree of shutdown for each stabilizing action.

20. The method of claim 9, wherein the prediction comprises one or more stabilizing actions and a predicted degree of shutdown for each stabilizing action.

* * * * *